Patented Apr. 14, 1942

2,279,493

UNITED STATES PATENT OFFICE 2,279,493

PRODUCTION OF THIOUREA-ALDEHYDE TYPE PRODUCTS

Kurt Ripper, Vienna, Austria, assignor to American Cyanamid Company, New York, N. Y., a corporation of Maine No Drawing. Application July 15, 1937, Serial No. 153,762. In Austria August 5, 1936

1 Claim. (Cl. 260—69)

This invention relates to a process for the production of thiourea-formaldehyde reaction products. It is more particularly concerned with carrying out the final hardening or the intermediate polymerization and final hardening of thiourea-formaldehyde reaction products at a pH above 7.

It is known that in condensing thiourea and formaldehyde, the reaction proceeds considerably more slowly than is the case in the condensation of urea with formaldehyde. It is also accepted that only substances of an acid nature are suitable for acceleration of the polymerization and final hardening of the intermediate products of the thiourea-formaldehyde condensation. Therefore, without exception, it has been recommended that higher concentrations of hydrogen-ions be used for the catalytic acceleration of the polymerization and/or hardening of any urea-formaldehyde condensation product.

Now I have discovered that the acceleration of the polymerization and/or hardening of the initial and intermediate condensation products of the thiourea-formaldehyde reaction is by no means restricted to the use of acid-acting accelerators, as has been generally assumed in the past. On the contrary I have found that alkaline acting agents are in a large measure suited to accelerate the intermediate polymerization as well as the final hardening of the intermediate products. By an addition of such agents in any desired stage of the reaction after the formation of the initial or intermediate condensation products, highly polymerized resins are obtained, which can be converted to completely hardened end products very quickly. Furthermore, I have found that the final hardening and/or polymerization of products which are obtained in a non-alkaline process can also be catalyzed by the addition of alkaline acting agents.

As alkaline acting agents I may use compounds capable of yielding OH-ions. These agents include inorganic or organic bases, and also compounds which, under the conditions of use, split off OH-ions by hydrolysis or other reaction.

In carrying out the process the initial or intermediate condensation products can be produced by any of the known methods. However, I have found that, not only can the intermediate polymerization and the final hardening of a thiourea-formaldehyde product be accelerated by alkaline materials, but that, under certain conditions, even the condensation of thiourea with formaldehyde to form the initial and intermediate condensation products can be carried out advantageously by an alkaline reaction as in the succeeding polymerization and/or hardening.

My new process is an extraordinarily simple, easily controlled method for the production of an extremely hydrophobe resin. In essence, it comprises initially reacting thiourea with formaldehyde and, after the mixture is made suitably alkaline, continuing the reaction at a temperature below that at which there is an appreciable decrease of the alkalinity produced by the occurrence of Cannizzaro-type reactions. Formaldehyde, under the influence of alkalies and heat, is converted to methyl alcohol and formic acid by simultaneous oxidation and reduction. In order to best condense formaldehyde with thiourea under alkaline conditions, it is therefore necessary to counteract this reaction, named after its discoverer, Cannizzaro, and such other reactions as bring about a decrease or elimination of the alkaline reaction, by maintaining a suitably low temperature. It is especially advantageous to work without any addition of heat. Dependent upon the chosen temperature, the hydroxyl-ion concentration and the molar ratio of the reaction components, the separation of an extraordinarily water-repellent resin starts after a shorter or longer reaction period, and this resin can be converted to the hardened state by a short heat treatment. When working without addition of heat an hydroxyl-ion concentration corresponding to a pH above 10 is chosen, advantageously a pH between 11 and 12. When carrying out the reaction by addition of heat the pH values are lowered accordingly.

To carry out the reaction, thiourea is mixed with an alkaline formaldehyde solution. The thiourea dissolves in the formaldehyde in a short time, even without addition of heat. In the beginning the solution remains miscible with water in all proportions. After some time a sample to which water is added begins to show cloudiness which point coincides closely to that representing the union of 1 mol. formaldehyde with each mol. of thiourea. When this condition is reached, or shortly before, the reaction is interrupted if the solution is to be used as an impregnating agent. This is especially true in those cases where the complete penetration of a fabric to be impregnated is desired. Otherwise, the reaction is allowed to go to completion with the production of a water-repellent product. If the reaction mixture is to be used for the production of lacquers, etc. it is left standing until a spontaneous separation into aqueous and resinous layers has resulted. These hints are to serve only as illustrative since the reaction mixture may be worked up by any other method in accordance with known processes.

The present process of polymerization and/or hardening in the presence of materials capable of yielding OH-ions fills a very real need whether used in combination with a known condensation process or with the described new alkaline condensation process. The acid process for polymerization and hardening, as generally used in this art, may sometimes be objectionable because the acid may attack the materials with which the condensation products are associated, or may, on the other hand, destroy the acid.

*Example 1*

38 parts by weight of thiourea are dissolved in a mixture of 83 parts by weight of aqueous-formaldehyde solution (37%), 83 parts by weight of water and 30 parts by weight of 4% caustic soda solution. The solution has a pH value of about 11.5. After standing at room temperature for 7 hours a sample on dilution with water shows cloudiness. On analysis it is found that one-half of the added formaldehyde is bound. The solution in this stage may be used for the treatment of textiles. In this case the pH value may be reduced somewhat, if desired, for special purposes. After hanging of the impregnated fiber or fabric at room temperature for a time, subsequent heating causes formation of an extraordinarily resistant polymerization stage of the thiourea-formaldehyde reaction product.

If the resin is to be used for other purposes it can be worked up alone or together with filler and fibrous materials of any kind by the known methods. By properly regulating the kind and quantity of the added alkaline accelerator, and the temperature and duration of the heating, any desired polymerization stage can be reached, depending on the duration of the hardening treatment, no matter whether it is carried out with or without simultaneous or succeeding use of pressure.

*Example 2*

83 parts by weight of formaldehyde solution (37%), 63 parts by weight of water, 50 parts by weight of 4% caustic soda solution and 38 parts by weight of thiourea yield a solution the pH of which lies between 11.8 and 11.9. Reacted at room temperature this mixture begins to show the hydrophobe stage after about 4 hours. The working up of this reaction product is carried out as described in Example 1.

*Example 3*

Instead of the molar ratio of 1 mol. thiourea to 2 mol. formaldehyde mentioned in the above examples a larger excess of formaldehyde can be used without disadvantage especially if the solution is to be used for textile treatment purposes.

105 parts by weight of formaldehyde solution (37%), 38 parts by weight of thiourea (corresponding to 1 mol. of thiourea to 2½ mols of formaldehyde), 63 parts by weight of water, 50 parts by weight of 4% caustic soda solution yield a solution the pH of which lies at 11.6. After about 6¾ hours reaction time the beginning of the hydrophobe state is reached. The working up is done as in Example 1.

*Example 4*

126 parts by weight of formaldehyde solution (37%), 38 parts by weight of thiourea (corresponding to a ratio of 1 mol. of thiourea to 3 mols of formaldehyde), 63 parts by weight of water and 50 parts by weight of 4% caustic soda solution give a pH value of 11.5. The reaction time at room temperature is about 7 hours until the beginning of the hydrophobe state is reached.

*Example 5*

A reaction batch of 63 parts by weight of formaldehyde solution (37%), 38 parts by weight of thiourea (corresponding to a molar ratio of 1 mol. of thiourea to 1½ mols of formaldehyde), 63 parts by weight of water and 50 parts by weight of 4% caustic soda solution gives a solution the pH value of which lies a little above 12.0. The beginning of the hydrophobe state is reached after about 6 hours reaction.

*Example 6*

Together with thiourea there can also be used such resin-forming compounds as are capable of reacting under the same conditions. Dicyandiamid is mentioned as an example.

19 parts by weight of thiourea and 21 parts by weight of dicyandiamid are dissolved in a mixture of 83 parts by weight of formaldehyde solution (37%), 63 parts by weight of water and 50 parts by weight of 4% caustic soda solution. The solution shows a pH value of 11.8. After about 3½ hours reaction time there is noted the beginning of the formation of a hydrophobe resin.

*Example 7*

Instead of the above described new condensation process any other desired methods for the production of intermediate products may be used.

152 parts by weight of thiourea are dissolved with stirring in 334 parts by weight of a 37% formaldehyde solution and the reaction mixture is left at 50° C. for about 3 to 4 hours.

If 50 parts by weight of this condensation solution are mixed with 25 parts by volume of a 4% caustic soda solution, the solution assumes a pH value of a little above 11.8, the beginning of a hydrophobe precipitation sets in at 50° C. after about ¾ of an hour; in another hour a hydrophobe resin layer has clearly separated.

If the same reaction mixture (50 parts by weight of condensation solution and 25 parts by volume of 4% caustic soda solution) is left at a temperature of 23° C. the beginning of a hydrophobe precipitation starts after about 4¾ hours reaction time.

If 50 parts by weight of the above described condensation products are adjusted to a pH value of 10.6 by the addition of 5 parts by volume of 4% caustic soda solution the beginning of the hydrophobe precipitation starts after reacting for about 4¾ hours at 50° C.

The working up of these products for any desired purpose (impregnating agent, lacquer base, binder for laminated or homogeneous pressed masses, etc.) can take place according to any of the known methods. Any desired stage of polymerization can be obtained by regulation of the alkalinity with corresponding control of the physical determining factors (such as especially temperature and duration of heating), depending on the desired duration of the hardening, no matter whether it takes place with or without the application of pressure.

For the production of lacquers the separation of the hydrophobe resin is allowed to go on spontaneously. Another way comprises distilling off the major portion of the water before the addition of the alkaline accelerator. The production of lacquers is then carried out in the known manner by addition of organic solvents, plasticizers and/or cellulose derivatives, etc.

Example 8

For the production of pressed masses the following procedure may serve as an example.

152 parts by weight of thiourea are allowed to react at 50° C. with 251 parts by weight of formaldehyde solution (37%) for several hours. Thereafter 33.5 parts by weight of 4% caustic soda solution are added. This mixture is then intimately kneaded with a fibrous filling material. That stage of polymerization at which quick pressing becomes possible can be attained by suitable heating during or after the kneading operation.

Not only are the initial or intermediate condensation products of formaldehyde with thiourea amenable to the alkaline polymerization and/or hardening, but also ether-like compounds such as are prepared for the purpose of lacquer and film production by the action of compounds containing at least one alcoholic hydroxyl group on the methylol-thiourea compounds. Furthermore instead of formaldehyde a polymeric formaldehyde can be utilized or another aldehyde such as acetaldehyde, acrolein, furfural, benzaldehyde, thioaldehyde, etc. Instead of thiourea there can be used thiourea yielding raw materials, and also thiourea derivatives such as alkyl-, aralkyl- or aryl-thioureas or thioureas substituted by hydroaromatic residues.

It is to be noted that the thiourea-formaldehyde condensates polymerized by alkaline additions (by which are to be understood all the above-named condensation products, their substitution as well as conversion and reaction products) are extremely miscible with addition compounds such as softening agents, plasticizers of all kinds, with celluloses, cellulose derivatives, cellulose conversion products, carbohydrate-like colloids and proteins of all kinds. In general, the polymerization and/or hardening of the thioureaformaldehyde reaction products can be carried out in the presence of any desired materials which tolerate or require the presence of alkaline reacting agents.

It will be apparent that other suitable changes and variations may be adopted in carrying out my invention which is not limited to the specific details set forth except as defined in the appended claim.

I claim:

The process which comprises reacting thiourea with formaldehyde at room temperature to produce a condensation product, the reaction being carried out at a greater alkalinity than pH 10 until the reaction products are incipiently hydrophobic and hardening the reaction products under alkaline conditions to produce infusible and insoluble materials, the reaction products being substantially free from urea.

KURT RIPPER.